Oct. 27, 1959  J. F. JOY  2,910,252
FISHING REEL AND SUPPORT THEREFOR
Filed Feb. 25, 1955  8 Sheets-Sheet 1

INVENTOR:
JOSEPH F. JOY
ATTORNEY

Oct. 27, 1959  J. F. JOY  2,910,252
FISHING REEL AND SUPPORT THEREFOR
Filed Feb. 25, 1955  8 Sheets-Sheet 2
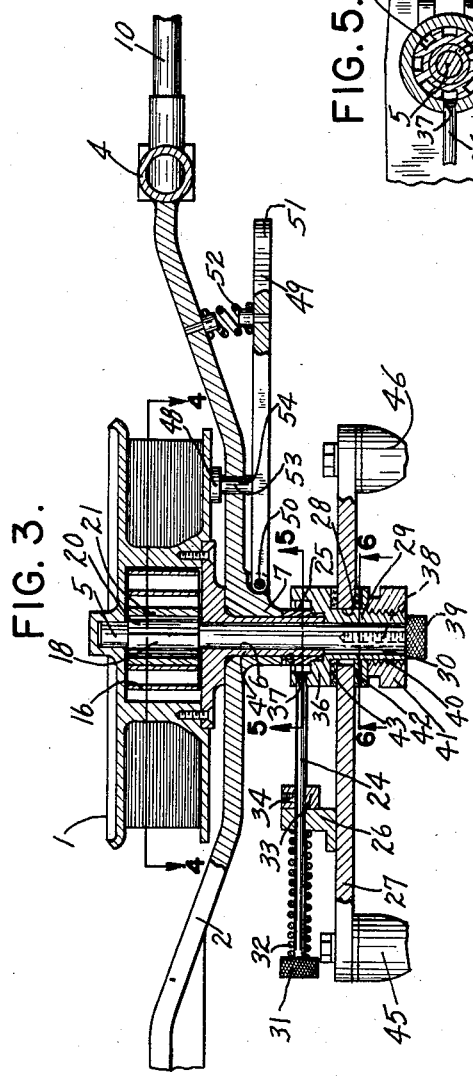
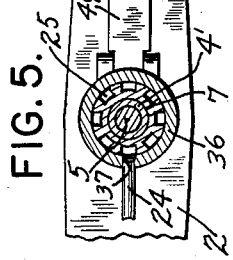
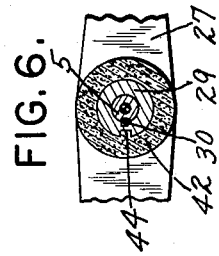
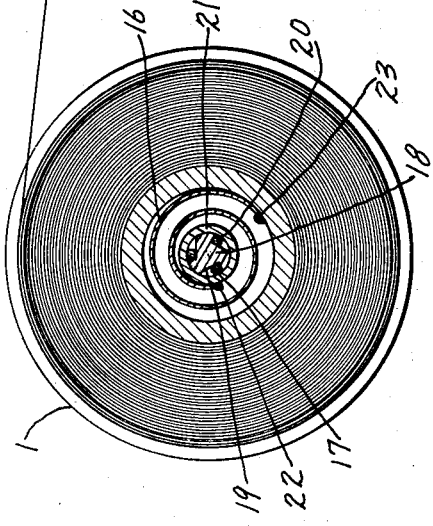
INVENTOR:
JOSEPH F. JOY
BY Charles F. Osgood,
ATTORNEY

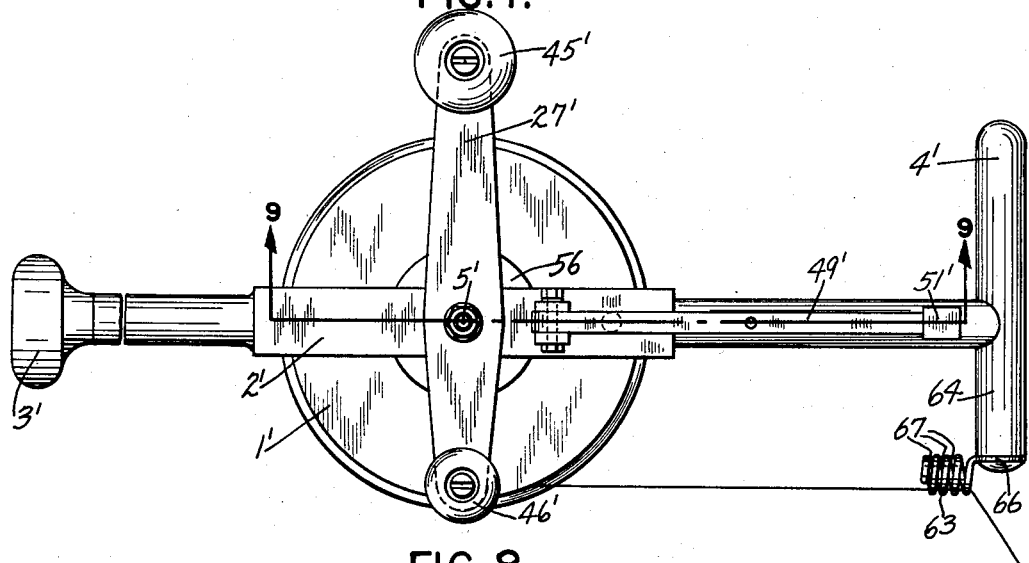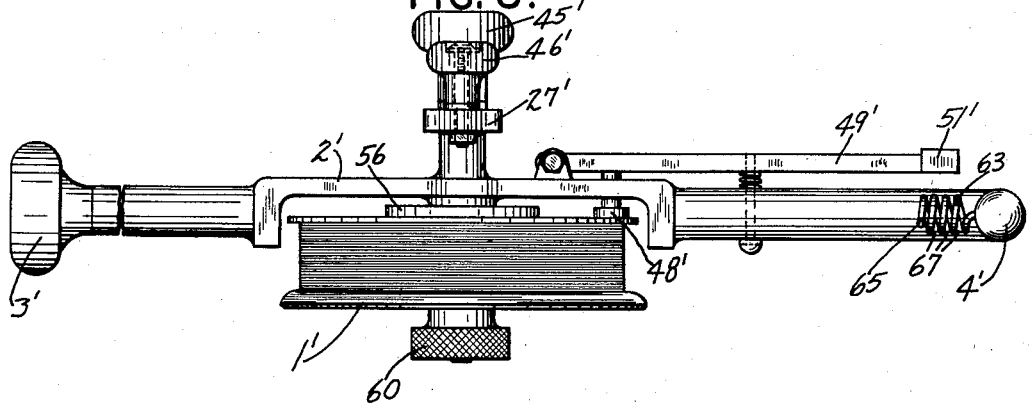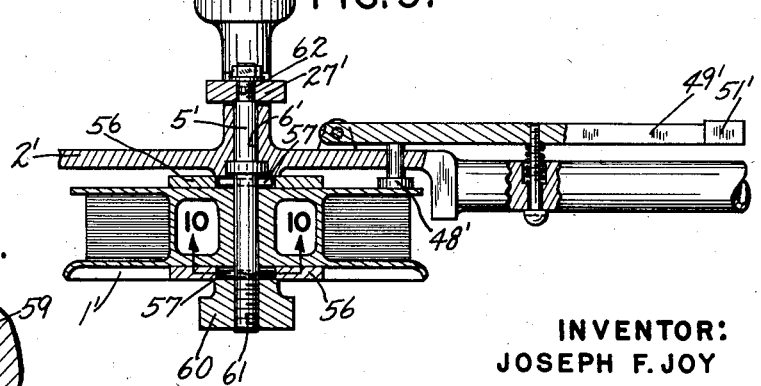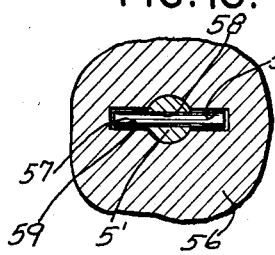

Oct. 27, 1959
J. F. JOY
2,910,252
FISHING REEL AND SUPPORT THEREFOR
Filed Feb. 25, 1955
8 Sheets-Sheet 4
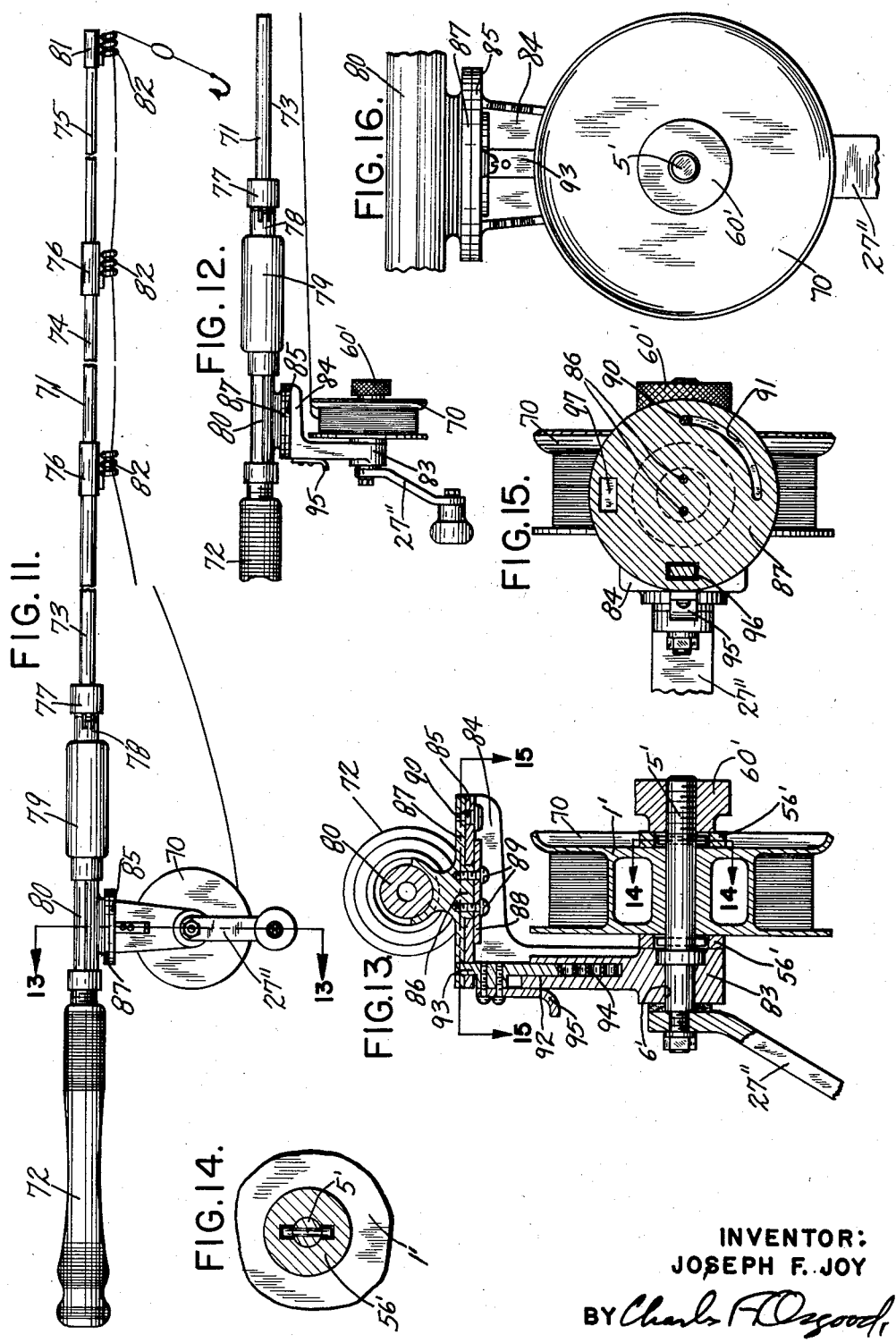
INVENTOR:
JOSEPH F. JOY
BY Charles F. Osgood,
ATTORNEY

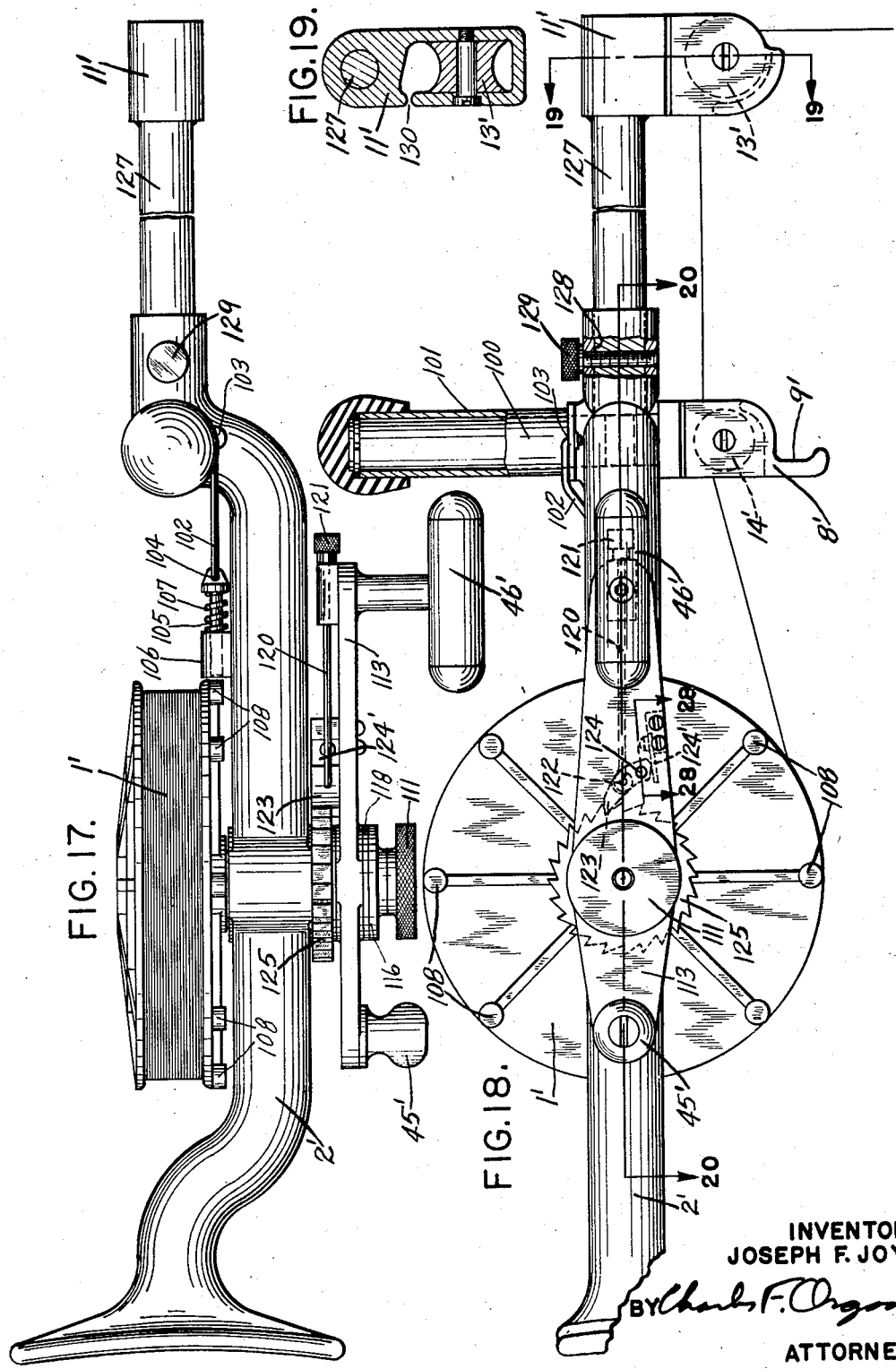

Oct. 27, 1959  J. F. JOY  2,910,252
FISHING REEL AND SUPPORT THEREFOR
Filed Feb. 25, 1955  8 Sheets-Sheet 6
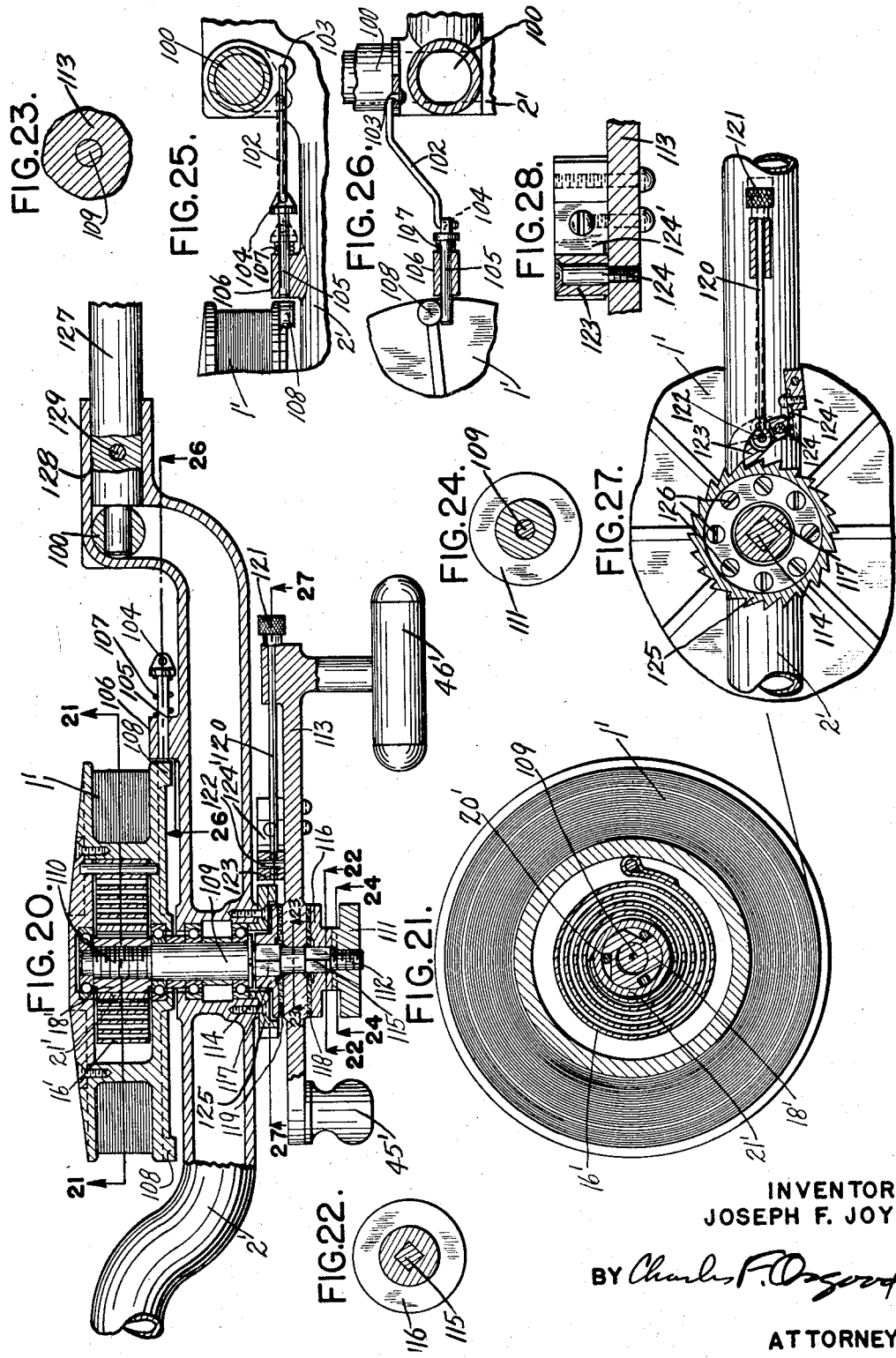
INVENTOR:
JOSEPH F. JOY
BY Charles F. Osgood
ATTORNEY

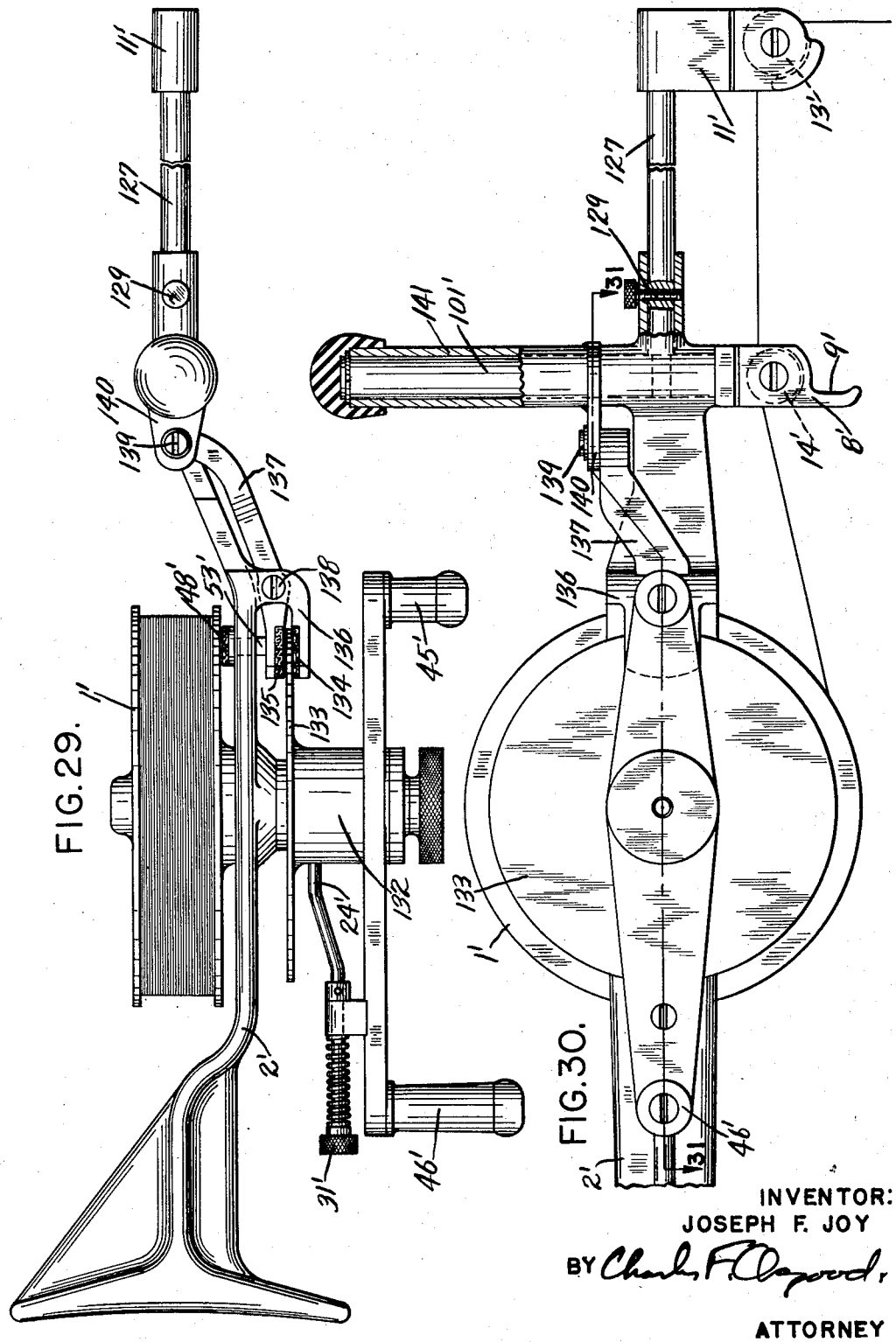

Oct. 27, 1959
J. F. JOY
2,910,252
FISHING REEL AND SUPPORT THEREFOR
Filed Feb. 25, 1955
8 Sheets-Sheet 8
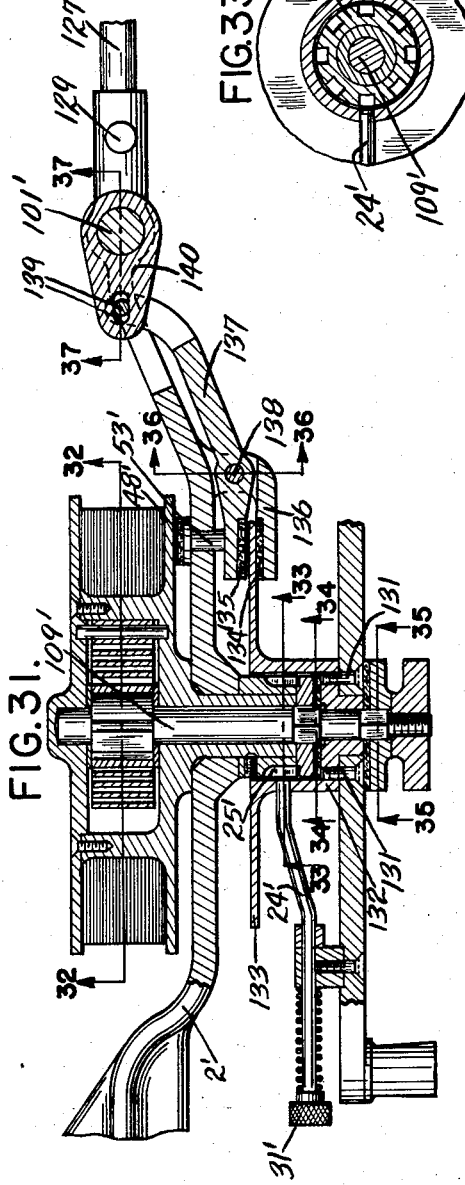
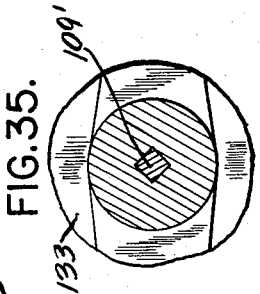
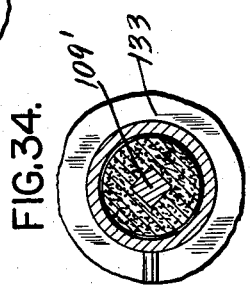
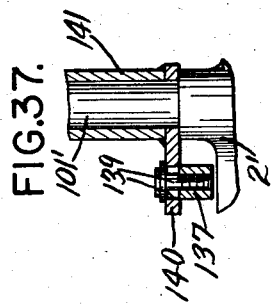
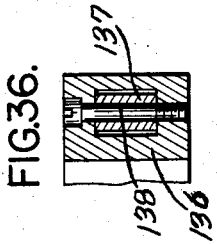
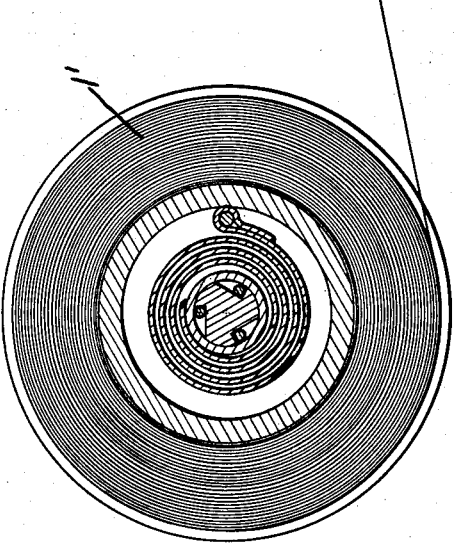
INVENTOR:
JOSEPH F. JOY
BY Charles F. Osgood,
ATTORNEY United States Patent Office 2,910,252
Patented Oct. 27, 1959

2,910,252

FISHING REEL AND SUPPORT THEREFOR

Joseph F. Joy, Pittsburgh, Pa.

Application February 25, 1955, Serial No. 490,549

7 Claims. (Cl. 242—84.3)

This invention relates to fishing tackle and more particularly to an apparatus for catching fish, particularly large ones from relatively deep waters requiring the use of boats, or from causeways, bridges, and the like where long-range casting is of no importance.

Usually in fishing of the present nature, relatively long and cumbersome fishing poles are commonly used and the chief function of the fishing pole, aside from the making of long casts, is the resiliency built into it for the purpose of assisting in keeping a taut line when a fish is being reeled in. Any fisherman of experience knows that a slack line usually means a lost fish and the maintenance of a taut line requires the pole to be held in a substantially upright position in order that the resiliency of the pole may function to assist in keeping the fishing line taut particularly during the forward plunge of the fish in a direction toward the fisherman. The holding of the pole in a substantially upright position is extremely difficult while retrieving a large, ferocious fish and this difficulty arises out of the fact that the fish being retrieved is pulling from the outer end of the pole thereby giving the fish a tremendous lever advantage over the fisherman who must resist such pull at the bottom end of the pole with but one hand, since the other hand must be occupied in turning the reel for pulling the fish in. The present invention contemplates improvements over known types of fishing tackle wherein fishing poles are employed in that the required resiliency is built into the reel in such a manner as to give the fisherman substantial lever advantage over the fish, such resiliency being attained by the provision of a spring motor or spiral spring enclosed within the body of the reel and having the outer end of the spring attached to the reel and the inner end attached to a driving thimble surrounding and rotatable relative to the drive shaft. The present invention further contemplates improvements over known types of fishing tackle in that the control and handling of the reel and its support are materially improved, particularly during trolling.

An object of the present invention is to provide an improved fishing tackle, whereby the need for a long and cumbersome fishing pole is eliminated and the required resiliency such as inherent in a fishing pole is built into the reel. Another object is to provide an improved fishing reel having improved control means. Yet another object is to provide an improved reel support whereby the need for a relatively long pole is eliminated. A still further object is to provide improved means for the storing of resilient energy within the apparatus and embodying means providing for the instantaneous release of the stored-up energy to set the hook when a fish strikes the lure and wherein the resilient means continues to assist in keeping a taut line as the fish is reeled in. Still another object is to provide a less cumbersome and more practical fishing tackle for use in trolling and embodying an improved spring motor or tension spring having improved means for pre-setting the same to a predetermined amount and to provide for its automatic release as a result of the pull on the line by the striking fish and the subsequent increase of the tension according to the resistance presented by the fish. A further object is to provide improved means for protection against line breakage due to overload and embodying an improved friction clutch capable of being set to slip at any desired tension on the line. A still further object is to provide an improved and conveniently operated latch for locking the reel against rotation to permit the tension spring or spring motor to be wound up a desired amount by the reel winding handle and improved ratchet and pawl arrangement associated with the handle to lock the same against counter-rotation when the desired spring tension is secured. Yet another object is to provide an improved reel latch which may be disengaged either manually or as the result of overwinding of the reel due to the pull on the line by a striking fish. Still another object is to provide an improved manner of attaching the tension spring to the reel drive shaft so as to avoid spring breakage arising out of over-running of the reel upon sudden release of the reel latch when the fishing line is under no load. A still further object is to provide an improved reel brake. Still another object is to provide an improved reel mounting embodying a swivel whereby the reel may be locked in positions at right angles with respect to each other and relative to the reel support or rod. These and other objects and advantages of the invention will, however, hereinafter more fully appear in the course of the ensuing description.

In the accompanying drawings there are shown for purposes of illustration several forms which the invention may assume in practice.

In these drawings:

Fig. 3 is a longitudinal section taken on line 3—3 of Fig. 2.

Fig. 4 is a vertical section taken through the reel, on line 4—4 of Fig. 3.

Figs. 5 and 6 are detail sections, taken on lines 5—5 and 6—6 respectively, of Fig. 3.

Fig. 7 is a side elevational view of a modified form of the reel and reel support.

Fig. 8 is a plan view of the reel and its support, shown in Fig. 7.

Fig. 9 is a longitudinal section taken on line 9—9 of Fig. 7.

Fig. 10 is a detail section taken on line 10—10 of Fig. 9.

Fig. 11 is a side elevational view of a further modified form of fishing tackle.

Fig. 12 is a fragmentary side elevational view showing the reel swiveled into a right-angle position.

Fig. 13 is a cross sectional view taken on line 13—13 of Fig. 11.

Fig. 14 is a detail section taken on line 14—14 of Fig. 13.

Fig. 15 is a transverse section taken on line 15—15 of Fig. 13, showing the swivel mounting for the reel.

Fig. 16 is a side view of the reel structure shown in Fig. 13.

Fig. 17 is a plan view of still another modified form of reel and reel support.

Fig. 18 is a side view of the reel and reel support shown in Fig. 17, with parts shown in vertical section.

Fig. 19 is a detail cross section taken on line 19—19 of Fig. 18.

Fig. 20 is a longitudinal section taken on line 20—20 of Fig. 18, illustrating details of the reel structure.

Fig. 21 is a vertical section taken through the reel on line 21—21 of Fig. 20.

Figs. 22, 23 and 24 are detail sections taken respectively on lines 22—22, 23—23 and 24—24 of Fig. 20.

Figs. 25 and 26 are detail sectional views, the latter taken on line 26—26 of Fig. 20, and looking respectively toward the top and side of the reel and reel support, showing details of the reel control associated with the front support handle.

Fig. 27 is a detail section taken on line 27—27 of Fig. 20.

Fig. 28 is an enlarged section taken on line 28—28 of Fig. 18.

Fig. 29 is a plan view and Fig. 30 is a side view of yet another modified construction.

Fig. 31 is a longitudinal section taken on line 31—31 of Fig. 30, illustrating details of the reel structure.

Fig. 32 is a vertical section taken through the reel on line 32—32 of Fig. 31.

Figs. 33, 34 and 35 are detail sections taken respectively on lines 33—33, 34—34 and 35—35 of Fig. 31.

Fig. 36 is a fragmentary cross section taken on line 36—36 of Fig. 31.

Fig. 37 is a detail vertical section taken on line 37—37 of Fig. 31, showing the reel brake control associated with the front support handle.

In the several embodiments of the invention, there is shown a support to be handled by the fisherman and carrying a reel on which a conventional fishing line is wound. A crank has a handle whereby, in certain instances, the spring motor of the reel may be wound up and, in other instances, the reel may be manually rotated, and the reel support has at least one guide along which the fishing line may pass as it extends from the reel, and a brake for resisting reel rotation is provided.

Figure 1:
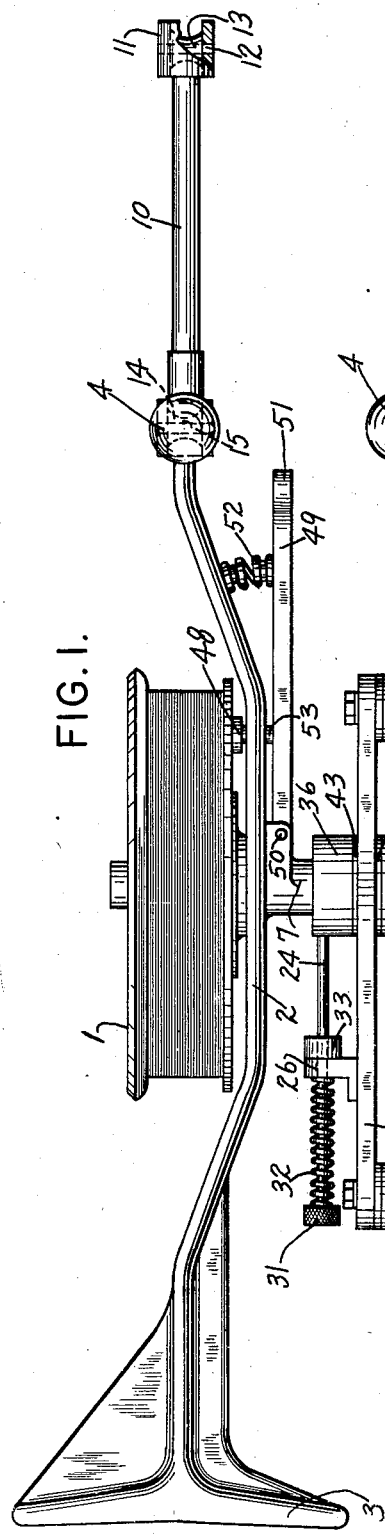
Fig. 1 is a plan view of a fishing reel and its support constructed in accordance with a preferred illustrative embodiment of the invention.
Figure 2:
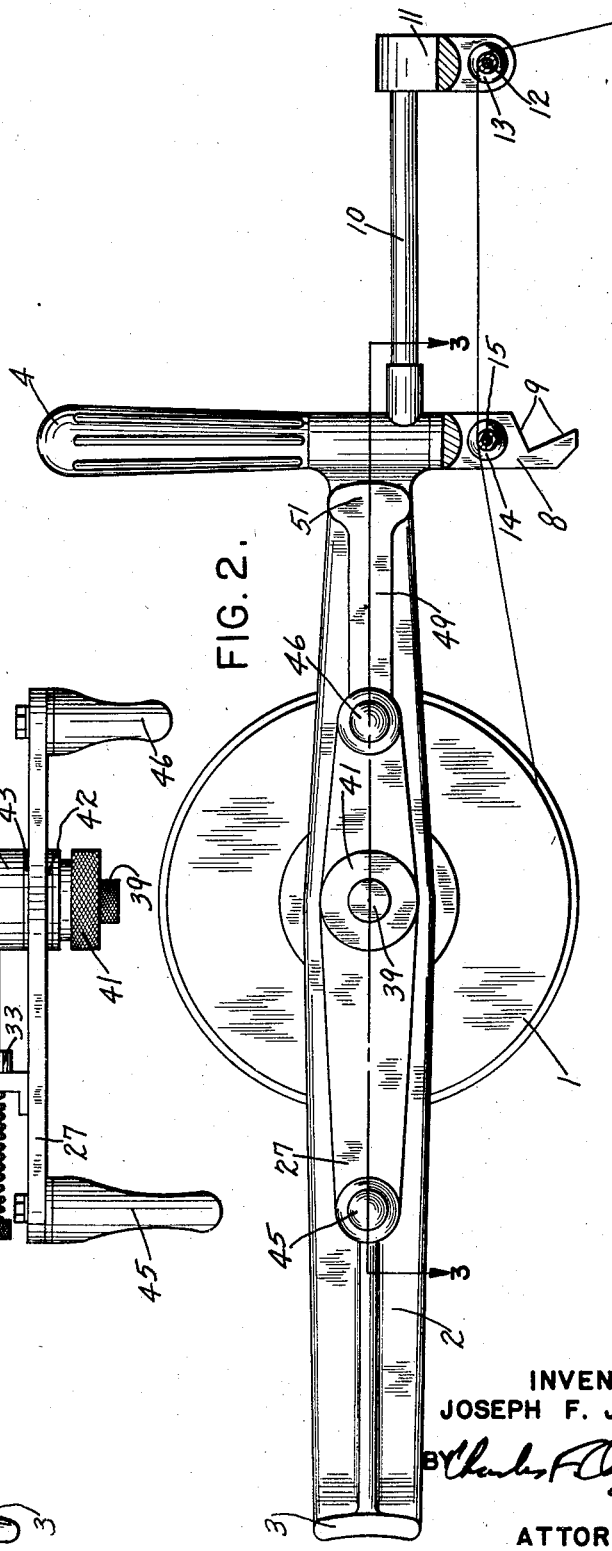
Fig. 2 is a side elevational view of the reel and its support, shown in Fig. 1.

Referring more particularly to the embodiment shown in Figs. 1 to 6 inclusive, it will be noted that a reel 1 is journaled on one side of a relatively short "poleless" support 2 having relatively short forward and rearward arms, the latter carrying a rear belt plate 3 adapted to rest against the body of the fisherman. The forward arm carries a front handle 4 provided for holding the reel support in the proper position during fishing. The reel 1 has a tubular portion or sleevelike hub 4' through which a transverse shaft 5 extends and the reel hub is rotatably supported, at 6, in a transverse bore of a bearing boss or sleevelike hub 7 on the support 2. The front holding handle 4 is disposed substantially upright at the top of the support 2 and depending from the support is a projection 8 provided with abutment surfaces 9 adapted to rest against a suitable extraneous support, such as the rail of a boat or a bridge or causeway rail. A forward projection 10 on the support carries a bracket 11 on which a shaft 12 is supported, and a guide roll or pulley 13 is journaled on this shaft between the sides of the bracket and a smaller guide roll or pulley 14 is journaled on the depending portion 8 between the sides thereof, on a transverse shaft 15. The fishing line wound on the reel may extend from the reel over the guide rolls or pulleys 13 and 14, as shown.

The reel is connectible to the shaft 5 through a spring motor embodying a spring 16 of the flat, spirally wound type and this spring motor is desirably arranged within the reel chamber and a ratchet and pawl device 17 of the roller and cam type is arranged between the shaft and the spiral spring. The shaft has an enlarged cylindrical head or ratchet member 18 formed with wedging or cam surfaces 19 engaged by roller pawls 20 which, in turn, may engage the bore-walls of a sleeve or thimble 21 coaxial with and surrounding the shaft enlargement. The coil spring is secured at its inner end, at 22, to the sleeve and at its outer end, at 23, to the reel body. Thus, when the shaft is rotated in a counter-clockwise direction, as viewed in Fig. 4, the wedging surfaces 19 force the roller pawls into gripping contact with the sleeve-bore to rotate the sleeve in unison with the shaft thereby to effect winding up of the coil spring as the reel is held against rotation by a detent rod 24 engaged in a notch of a ratchet 25 secured to the hub 4' of the reel 1.

The detent rod or latch 24 is guided in a guide 26 on a hand crank 27 located at the opposite side of the support 2 from the reel and this crank is rotatably mounted, at 28, on a sleeve 29 keyed, at 30, to the shaft 5. Surrounding the detent rod and interposed between the guide 26 and a releasing knob 31 on the rod is a coil spring 32 which urges the detent rod toward released position. A collar 33 secured to the rod by a setscrew 34 is engageable with the guide 26 for limiting the outward movement of the detent rod.

The sleeve 29 has an enlarged annular head 36 surrounding the ratchet 25 and the inner portion of the detent rod 24 is guided in a radial bore 37 in the sleeve head, as shown in Fig. 3. A screw 38 having a knurled head 39 is threaded within the adjacent end portion of the shaft 5 for holding the sleeve 29 in position on the shaft. Threadedly engaging the sleeve 29, at 40, is a knurled adjusting nut 41 and interposed between this nut and the crank arm 27 is a friction disk 42 desirably composed of fibre. A similar fibre disk 43 is interposed between the crank arm and the adjacent face of the sleeve head 36. These disks are keyed, at 44, to the sleeve 29 so that when the nut 41 is screwed inwardly the disks directly connect the crank arm 27 and the sleeve 29 to secure the shaft 5 for rotation by the hand crank. These friction disks and their associated parts cooperate to provide a slip clutch which may be adjusted to slip at a safe load for the fishing line being used, thereby to eliminate line breakage due to overloading of the line.

As shown, the crank arm 27 has opposed lever portions of different lengths provided with handles 45 and 46 respectively, and the release knob 31 for the detent rod 24 is located in adjacency to the handle 45 so that it may be conveniently operated by the hand of the fisherman which grasps the handle 45. The handle 46 of the short lever arm of the crank may be used rapidly to wind in the line on the reel and the handle 45 of the longer lever arm of the crank is employed in the winding up of the spring motor.

Thus, by turning the crank and the shaft 5 in a counter-clockwise direction, as viewed in Fig. 4, the roller pawls 20 of the ratchet drive the thimble or sleeve 21 thereby to wind up the coil spring 16; it being understood that at this time the reel is held against rotation by a brake member 48 engaging the adjacent face of the reel body near the reel-periphery. This brake member may be operated by a lever 49 pivotally mounted, at 50, on the support 2 near the hub of the latter, and the lever 49 has an operating portion 51 arranged in adjacency to the front holding handle 4 of the reel support so that the hand of the fisherman grasping the support handle may conveniently operate the brake lever. Arranged between the reel support and the brake lever is a coil spring 52 for urging the brake lever toward its released position. The brake member has a plungerlike portion 53 guided within a bore 54 in the reel support. When the coil spring of the spring motor is completely wound up the reel 1 may be locked against rotation in unwinding direction relative to the reel support 2 by the detent rod 24 engaging one of the notches of the ratchet 25. When the detent rod 24 is released, the coil spring 16 may rapidly rotate the reel in winding direction during rotation of the reel by the spring motor and the nut 41 may be screwed outwardly to release the pressure on the fibre disks 42, 43 so that the hand crank may remain stationary as the reel is rapidly rotated to wind in the fishing line.

By the provision of the thimble or sleeve 21 between the spring motor and the shaft 5 the possibility of breakage of the spring is reduced to a minimum, the sleeve rotating relative to the shaft should the spring motor for any reason be permitted to suddenly discharge its torque from a completely wound position and by reason of its momentum causing overrunning of the spring. Obviously, the sudden discharge of the torque of the spring motor would likely result in a broken spring if the inner end of the spring were directly secured to the shaft 5. This construction also provides for the easy and convenient removal and replacement of the motor spring.

In a fishing tackle of this character, it is intended that a variety of reels carrying different strength lines and having different spring motor capacities be made available. For instance, if the catch is expected to be such as tarpon, sail fish, marlin and the like, the tackle should be equipped with a one-hundred pound line, large hook, and spring motor capable of exerting around one-hundred inch pounds of torque or better than thirty pounds into the line. When smaller and less ferocious fish are being sought, such as weak fish or so-called sea trout which have especially weak mouths, light line and hook should be used along with a spring motor having a relatively light torque. Such fish can, of course, be taken on heavy lines and motor equipment by applying a light winding pressure to the reel and thus avoid tearing the hook from the mouths of the weaker variety of fish. As aforementioned, the projection 8 at the bottom of the reel support 2 may engage the rail of a boat, or a bridge or causeway rail, to support the tackle in position so that the pull of a hard-fighting fish may be absorbed by the rail instead of being entirely resisted by the fisherman.

The mode of use of the fishing tackle above described will now be briefly described. The fisherman may grasp the front support handle 4 to hold the support 2 in position with the plate 3 resting against the fisherman's body and with the fishing line extending from the reel over the guide rolls 14, 13 in the manner shown and, if desired, the abutment surfaces 9 of the lower bifurcated projection 8 may rest against some extraneous support, such as the rail of a boat or a bridge or causeway rail, to enable the operator to steady the support, while a substantial portion of the load during landing of a fish is absorbed by the rail. During rotation of the reel in unwinding direction, as for example, during casting of the fishing line, the friction disks 42, 43 may be relieved of pressure by the adjusting nut 41 so that the reel may rotate relatively freely; the roller pawls 20 of the ratchet releasing automatically to permit such relatively free rotation of the reel at that time. After the line has been cast, the operator may depress the brake lever 49 with the hand which grasps the front support handle 4 without releasing the grip on the handle to move the brake member 48 into braking contact with the adjacent face of the reel to hold the latter against rotation relative to the support 2. The crank lever 27 may then be turned to wind up the spiral spring 16 and as the torsion spring is completely wound up, the operating knob 31 for the detent rod 24 may be depressed to hold the detent rod in one of the notches of the ratchet 25 to hold the reel against rotation in the unwinding direction. In the event a fish bites the hook of the fishing line, the detent rod 24 may be released from the ratchet 25 to permit the torsion spring to rapidly rotate the reel in winding direction so that the fishing line may be quickly drawn in to assure hooking of the fish. When a fish is hooked and is being retrieved, the coil spring maintains the line taut and the resiliency of the spiral spring takes the place of the resiliency of a conventional flexible fishing rod. Also, the at least partially unwound torsion spring provides some resiliency so that sudden shock loads on the fishing line are, at least to some extent, absorbed by the spring, likewise in the manner of a flexible fishing pole. By tightening the adjusting nut 41 the friction disks 42, 43 may be pressed against the surfaces of the crank arm 27 so that the spiral spring may be wound up by the crank while the reel is held against rotation in unwinding direction. Evidently, when the fisherman releases the pressure on the operating knob 31 for the detent rod, the coil spring 32 moves the latter into its released position out of engagement with the ratchet 25. In the event a fish is pulling the fishing line off from the reel, the rotation of the reel may be readily controlled by the brake member 48; it being possible for the fisherman to depress the operating portion of the brake lever 49 without releasing his grip on the front support handle 4.

The structure of the modified embodiment of the invention shown in Figs. 7 to 10 inclusive differs from that above described in that the spring motor is omitted and a fishing reel 1' is rotatably mounted on a relatively short, rigid support 2' having a short rearward arm carrying an inner belt plate 3' and a short forward arm carrying a front support handle 4'. In this modified construction, a shaft 5' is journaled, at 6', within the hub of the support and the reel is journaled on this shaft. Friction disks 56 are secured by pins 57 to the shaft 5' and these pins are fitted within transverse bores 58 in the shaft and are seated at their ends within slots 59 in the disks. A knurled adjusting nut 60, threaded, at 61, on the outer end of the shaft, serves to press the friction disks 56 against the surface of the reel, frictionally to connect the reel to the shaft. These disks may be set to slip at a predetermined load to prevent breakage of the line, as in the embodiment above described. Secured at 62 to the opposite end of the shaft is a crank arm 27' having handles 45' and 46'. A brake member 48' operated by a brake lever 49' is engageable with the adjacent face of the reel for braking reel rotation. As in the embodiment above described, the operating portion 51' is located in adjacency to the front support handle 4'. The nut 60 may be released to free the reel for rotation relative to the shaft during casting of the fishing line and the brake member 48' may be conveniently operated to brake reel rotation during paying out of the line, also as in the embodiment above described.

In this modified construction, shown in Figs. 7 and 8, the fishing line extends from the reel through a guide 63 secured to a depending portion 64 of the front support handle 4'. This guide comprises a piece of helically wound wire assuming the form of a coil spring and has a free end 65 and a bent end 66 secured to the handle projection. The fishing line may be moved into the open center of this guide by threading the line through the spaces between the coils 67 thereby eliminating the need for detaching the hook, lure and sinkers from the line such as is necessary when a usual guide ring or eyelet is employed.

In a further modification, shown in Figs. 11 to 16 inclusive, the fishing reel 70 is similar to that shown in Fig. 9 and is mounted on a conventional flexible fishing rod 71 having a handle 72. The fishing rod may comprise sections 73, 74 and 75 coupled together by coupling members 76 and attached at 77 to another rod member 78 having a rearward sleeve portion 79. A reel support 80 is connected between the handle 72 and the rearward sleeve portion 79. Each of the coupling members 76 and the outer end member 81 carry a helically formed guide 82 similar to the guide 63 of the modified embodiment above described, through which the fishing line passes. Here, too, the fishing line is attached to the guides without the need for detaching the hook, lure and sinkers from the line.

Now referring to the reel structure of this further modification, it will be noted that the reel 1' is journaled on the shaft 5' rotatably journaled at 6' within a bracket 83 depending from a support 84 swivelly mounted on the reel support 80. The support 84 has a swivel plate 85 rotatably mounted on a circular bearing support 86 integral with the upper swivel plate 87 secured to the reel support 80. A retaining plate 88 secured, as by screws 89, to the support 80 holds the swivel plate 85 in position on its swivel mounting. A pin 90 secured to the swivel plate 85 extends within an arcuate slot 91 in the upper plate 87 so that the bracket support 84, by which the reel is carried, may be turned on its swivel through 90°. Guided on the bracket arm at 92 is a shiftable latch 93 urged outwardly by a string 94 and having an operating handle 95. This latch may project within openings 96 and 97 appropriately spaced in the upper plate 87 to lock the reel bracket in either extreme adjusted position on its swivel mounting. The latch may be pressed inwardly by the handle 95 to release the latch from the opening 96 or 97 to free the reel bracket for turning movement on its swivel. It will thus be seen that the reel may be turned from a position wherein its axis of rotation extends transversely of the fishing rod (Fig. 11) through 90° to a position wherein the axis of reel rotation extends longitudinally in parallelism with the longitudinal axis of the fishing rod (Fig. 12). As in the modified embodiment above described, friction disks 56' are secured to the shaft 5' and a knurled adjusting nut 60' serves to press the disks into frictional contact with the reel, frictionally to resist reel rotation. A crank handle 27" is secured to the shaft for rotating the reel. It will thus be seen that the reel may be rotated by the crank and the friction disks may be adjusted to release the reel from the crank thereby to release the reel for free rotation when desired. As in the other embodiment, the friction disks may be loaded to slip upon a predetermined load to prevent line breakage, and a similar reel brake may be provided.

When the reel is in its right-angle position, as shown in Fig. 12, the reel may be conveniently operated for casting purposes and location of the reel in the position shown in Fig. 11 facilitates control of the reel during trolling and the catching and landing of a fish.

Now referring to the modification shown in Figs. 17 to 28 inclusive, it will be noted that the reel 1' and reel support 2' of Figs. 17 and 18 are quite like those of the embodiment first above described. In this instance, however, the front upright supporting handle 100 has turnably mounted thereon a sleevelike or tubular grip 101 to which a shiftable operating element 102 is pivotally connected at 103. This operating element is suitably connected at 104 to a detent plunger 105 guided in a guide member 106 secured to the adjacent side of the reel support 2'. This detent 105 is urged toward its released position by a coil spring 107, and the grip 101 may be turned to force the detent inwardly against the action of the spring into engagement with any one of a series of equally spaced projections 108 integral with the reel near the reel-periphery (Fig. 18). Thus, the reel may be held against rotation by the detent 105 and the latter may be released at will simply by turning the hand grip by the hand which holds the front handle of the reel support. Arranged between the reel and a reel shaft 109 is a roller ratchet 18', 20' and a torsion spring 16' similar to those above described (Fig. 4) and the ratchet rollers engage the walls of the bore of a sleeve 21' to which one end of the torsion spring is connected. A ratchet member 18' is threadedly secured at 110 to the shaft 109. A knurled knob 111 is threadedly connected at 112 to the shaft 109 and a hand crank or crank handle 113 is turnably mounted on a cylindrical portion of this shaft intermediate portions 114 and 115 of polygonal cross section (see Figs. 22 and 27). The threaded knob 111 engages an annulus 116 having a polygonal bore through which the polygonal shaft portion 115 passes, while a similar annulus 117 has a polygonal opening receiving the polygonal shaft portion 114 so that the annulii 116 and 117 rotate in unison with the shaft 109. Interposed between these spaced annulii and the opposite faces of the crank 113 are fibre brake disks 118 and 119. Thus, when the knob 111 is turned inwardly on the shaft, the annulii cause the brake disks to be held under a predetermined load in frictional contact with the opposite faces of the crank to connect the latter to the shaft and when the pressure on these brake disks is released, the crank may turn freely relative to the shaft. An operating rod 120 is guided on the crank and has a conveniently located operating knob 121, and the rod 120 is suitably connected at 122 to a pawl 123 (Fig. 27) pivotally mounted at 124 on the crank. A spring 124' engages the pawl for yieldingly maintaining the same in its different positions in a conventional manner. This pawl is engageable with the teeth of a ratchet 125 secured, as by screws 126, to the reel support 2'. Thus, when the pawl is engaged with the ratchet, as shown in Fig. 27, the crank is held against undesired backward turning while permitting turning of the crank during the winding up of the torsion spring 16'. When the detent 105 is released from the reel, the torsion spring may rapidly rotate the reel in winding direction, as in the embodiment first above described.

In this modified construction, the reel support 2' is desirably tubular in form and a front rodlike member 127 is fitted in a socket 128 of the support longitudinally in advance of the front handle 100 (Fig. 20), and the member 127 is held in its socket by a setscrew 129 (Fig. 18). Secured to the forward end of the member 127 is a bracket 11' on which a front guide roll or pulley 13' is journaled. The bracket has a narrow opening 130 at one side (Fig. 19) at the top of the guide roll 13' so that the fishing line may be readily disengaged from the guide, while normally retaining the line in guided engagement with the guide roll. Depending from the reel support beneath the front holding handle is a projection 8' having an abutment surface 9' for engagement with a suitable extraneous support. The rear guide roll 14' is journaled on the projection 8' and the fishing line may be extended from the reel forwardly over these guide rolls, as in the embodiment shown in Figs. 1 and 2.

In Figs. 29 to 37 inclusive, still another modification is shown and, in this modification, the reel and reel support are essentially the same as those of the embodiment last above described. The reel support 2' is quite like that shown in Figs. 1 and 2 in this instance, however, and the torsion spring and roller ratchet are quite like those shown in Figs. 3 and 4. In this construction, the hand crank for turning the reel is secured, as by screws 131, to a sleevelike hub member 132 rotatably mounted on the shaft 109', Integral with the hub 132 is a brake disk 133 with the opposite faces of which brake elements or shoes 134 and 135 are engageable (Fig. 31). The brake disk 134 is supported by a bracket 136 integral with the reel support, while the brake element 135 is carried by a lever 137 pivotally mounted at 138 on the bracket 136. This lever is loosely connected at its outer end, as by a pin and slot connection 139, to a lever arm 140 formed on a tubular hand grip 141, turnably mounted on the upright front handle 101' of the reel support. Thus, the fisherman may apply the brake elements to the disk to hold the hand crank against rotation without releasing his hand from the front handle of the reel support. The lever 137, when moved in the opposite direction, engages a plungerlike portion 53' of a brake member 48' to move the latter into frictional contact with the adjacent face of the reel near the reel periphery (Fig. 31). Thus, by properly turning the tubular grip 141' on the front support handle either the reel crank or the reel may be frictionally held against rotation. A detent rod 24' guided on the crank has an operating knob 31' and this detent rod is guided in a radial bore in a sleevelike hub 132 of the brake disk. When this detent rod is pressed inwardly, it engages the teeth of a ratchet 25' secured to the reel (see also Fig. 33) for positively connecting the reel crank to the reel. Otherwise, this embodiment is similar to the embodiment last above described.

As a result of this invention an improved fishing tackle is provided wherein the resiliency of a conventional fishing pole is built into the reel itself whereby the reel may be mounted on a relatively short and rigid, easily maneuverable support. By embodying the spiral spring of the spring motor in the reel in the manner disclosed not only is the desired resiliency obtained but also the spring, when wound up tightly, stores up energy which, when released, may rapidly rotate the reel in winding direction. The detent or ratchet mechanism serves to hold the reel against undesired rotation during winding up of the torsion spring by the crank handle, and the friction clutch between the crank and reel shaft may be set to slip automatically upon overload of the fishing line to prevent line breakage. The novel arrangement of the brake handle with respect to the support handle enables the fisherman readily to control the brake without releasing his grip on the support. By the provision of the novel features above referred to, the fishing tackle is a superior device for the taking of fish heretofore caught by use of hand-held poles of even the most rugged type. Furthermore, poles and reels of equal capacity not only have a cost much in excess of this new tackle but their range of use is far less, and such pole-type equipment does not have the compactness with the ease of transport inherent in the tackle of the present invention. The improved reel is relatively simple and rugged in design, well adapted for its intended purpose. Further uses and advantages of the invention will be clearly apparent to those skilled in the art.

While there are in this application specifically described several forms which the invention may assume in practice, it will be understood that these forms of the same are shown for purposes of illustration and that the invention may be modified and embodied in various other forms without departing from its spirit or the scope of the appended claims.

What I claim as new and desire to secure by Letters Patent is:

1. A fishing reel apparatus comprising, in combination, a reel support, a transverse shaft journaled on said support, a hand crank for rotating said shaft, a line reel journaled on said shaft and surrounding the latter, a roller ratchet member coaxial with and fixed to said shaft within said reel, a rotatable sleeve coaxial with and surrounding said ratchet member, a roller ratchet between said ratchet member and said surrounding sleeve for connecting the latter to said shaft for rotation at the same angular rate therewith as said shaft is turning in one direction by said hand crank, said roller ratchet permitting said reel to rotate in the opposite direction relative to said shaft, said reel being hollow, and a coil spring motor arranged within said reel with one end of the spring secured to said reel and the other end secured to said surrounding sleeve, the latter when rotated with said shaft through said ratchet effecting winding up of said coil spring motor.

2. A fishing reel apparatus as set forth in claim 1 wherein an adjustable friction slip clutch is arranged between said hand crank and said shaft embodies adjusting means for varying the frictional operation of said clutch to permit relative movement between said hand crank and said shaft when the latter is overloaded.

3. A fishing reel apparatus as set forth in claim 1 wherein releasable means is provided on said support for holding said reel against rotation relative to said support as said spring motor is wound up by said hand crank through said roller ratchet.

4. A fishing reel apparatus as set forth in claim 3 wherein releasable means is provided between said hand crank and said support for locking said hand crank against rotation in one direction relative to said support.

5. A fishing reel apparatus as set forth in claim 4 wherein said releasable means comprises a ratchet and pawl device for permitting rotation of said hand crank in the opposite direction.

6. A fishing reel apparatus as set forth in claim 1 wherein said transverse shaft has end portions projecting freely from the opposite sides of said reel support and said reel being disposed on one end portion at one side and exteriorly of said support and said hand crank being disposed on the opposite end shaft portion at the opposite side and exteriorly of said support.

7. A fishing reel apparatus as set forth in claim 6 wherein said reel support has relatively short forward and rearward arms, each having a portion engaged by the fisherman operating the reel, said arms extending longitudinally of the reel apparatus intermediate said reel and said hand crank.

References Cited in the file of this patent

UNITED STATES PATENTS

| | | |
|---|---|---|
| Re. 11,006 | Carey | June 11, 1889 |
| 841,890 | Pepper | Jan. 22, 1907 |
| 1,953,693 | Stubblefield | Apr. 3, 1934 |
| 2,257,023 | Ray | Sept. 23, 1941 |
| 2,463,108 | Jacobson | Mar. 1, 1949 |
| 2,484,727 | Patterson | Oct. 11, 1949 |
| 2,536,583 | Tank | Jan. 2, 1951 |
| 2,612,714 | Coleman | Oct. 7, 1952 |
| 2,616,204 | Bennett | Nov. 4, 1952 |
| 2,630,978 | Skarbek | Mar. 10, 1953 |
| 2,697,894 | Graham et al. | Dec. 28, 1954 |
| 2,708,079 | Sarah | May 10, 1955 |